(12) United States Patent
Ou (10) Patent No.: US 8,898,332 B2
(45) Date of Patent: Nov. 25, 2014

(54) METHODS, SYSTEMS, DEVICES AND COMPUTER PROGRAM PRODUCTS FOR PROTECTING A NETWORK BY PROVIDING SEVERABLE NETWORK ZONES

(75) Inventor: Shukong Ou, Winchester, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 956 days.

(21) Appl. No.: 12/274,486

(22) Filed: Nov. 20, 2008

(65) Prior Publication Data

US 2010/0125662 A1 May 20, 2010

(51) Int. Cl.
*G06F 13/00* (2006.01)
*G06F 21/55* (2013.01)
*H04L 29/06* (2006.01)

(52) U.S. Cl.
CPC .............. *H04L 63/20* (2013.01); *G06F 21/554* (2013.01)
USPC ............ 709/238; 229/225; 229/224; 229/249

(58) Field of Classification Search
CPC .............................. H04L 63/20; G06F 21/554
USPC ................. 709/224, 238–244, 229, 225, 249; 714/2–4, 4.1–4.5; 726/2–4
See application file for complete search history.

(56) References Cited

U.S. PATENT DOCUMENTS

| | | | | |
|---|---|---|---|---|
| 5,996,009 A * | 11/1999 | Kitamura et al. | ............. | 709/223 |
| 6,209,018 B1 * | 3/2001 | Ben-Shachar et al. | ......... | 718/105 |
| 7,058,844 B2 * | 6/2006 | Wiley et al. | ........................ | 714/4 |
| 7,590,710 B1 * | 9/2009 | Kokal et al. | .................... | 709/219 |
| 7,644,151 B2 * | 1/2010 | Jerrim et al. | ................... | 709/224 |
| 7,877,786 B2 * | 1/2011 | van Bemmel | ...................... | 726/4 |
| 7,895,326 B2 * | 2/2011 | Jerrim et al. | ................... | 709/224 |
| 2001/0010053 A1 * | 7/2001 | Ben-Shachar et al. | ........ | 709/105 |
| 2002/0085547 A1 * | 7/2002 | McNamara | ................... | 370/386 |
| 2002/0194524 A1 * | 12/2002 | Wiley et al. | ........................ | 714/4 |
| 2003/0237017 A1 * | 12/2003 | Jibbe | ................................. | 714/4 |
| 2006/0101409 A1 * | 5/2006 | Bemmel | ........................ | 717/126 |
| 2006/0176888 A1 * | 8/2006 | McNamara | ................... | 370/401 |
| 2010/0138535 A1 * | 6/2010 | Jerrim et al. | ................... | 709/224 |

* cited by examiner

*Primary Examiner* — Kenneth Coulter
(74) *Attorney, Agent, or Firm* — Myers Bigel Sibley & Sajovec (57) ABSTRACT

Provided is a computer network that includes computer network devices that are grouped into severable computer network zones and that are operable to detect non-compliant network activity in another of the severable computer network zones. The computer network includes multiple intra-network communication connections that are operable to communicatively couple the severable computer network zones to one another and to be selectively disconnected responsive to the detection of non-compliant network activity in a first zone of the severable computer network zones to isolate the first zone from other of the severable computer network zones.

6 Claims, 5 Drawing Sheets

METHODS, SYSTEMS, DEVICES AND COMPUTER PROGRAM PRODUCTS FOR PROTECTING A NETWORK BY PROVIDING SEVERABLE NETWORK ZONES

BACKGROUND

The present disclosure relates to methods, systems, devices and computer program products related to networks and, more particularly, to protecting computer networks.

Computer networks have grown increasingly complex with the use of distributed client/server applications, mixed platforms and multiple protocols all on a single physical backbone. The control of traffic on the networks is likewise moving from centralized information technology (IT) departments to distributed workgroups. The growing utilization of computer networks is not only causing a move to new, high-speed technologies, but is at the same time making the operation of computer networks more critical to day-to-day business operations.

Complexity may be further increased as organizations merge and connect previously separate networks into a single network. The growth in complexity and dependence on computer networks heightens the need for protecting a network from unauthorized and/or malicious activity. Such networks, however, may limit the effectiveness of network security to that of the weakest link in the network or a well-protected portion of the network. Additionally, as networks grow, they may increasingly include components that have been implemented as exceptions to network design specifications and/or may not be sufficiently documented. Accordingly, networks may be increasingly at risk due to their increase in complexity and/or size.

SUMMARY

In some embodiments described herein, methods of protecting a computer network are provided. Methods may include detecting non-compliant network activity in a first zone of multiple severable computer network zones in a computer network. Some embodiments provide that each zone is operable to transmit and/or receive data to and/or from at least one other of the severable computer network zones and that there are a plurality of intra-network communication connections through which ones of the severable computer network zones transmit and/or receive data to and/or from other ones of the severable computer network zones. Methods may include, responsive to detecting the non-compliant network activity in the first zone, isolating the first zone from other ones of the severable computer network zones by disconnecting ones of the intra-network communication connections that are between the first zone and other ones of the severable computer network zones.

Some embodiments include generating multiple compliance policies corresponding to each of the severable computer network zones. Some embodiments provide that each of the severable computer network zones includes zone specific compliance policies. In some embodiments, detecting non-compliant network activity in the first zone includes detecting, within a second zone of the severable computer network zones, activity occurring in the first zone that is non-compliant regarding a policy corresponding to the second zone. Some embodiments provide that isolating the first zone from other ones of the severable computer network zones includes disconnecting ones of the intra-network communication connections that are between the first zone and the second zone.

In some embodiments, generating the compliance policies includes receiving, from a service provider, multiple non-compliant activity signatures. Some embodiments provide that detecting non-compliant network activity includes analyzing network activity using the non-compliant activity signatures.

In some embodiments, the severable computer network zones include virtual local area networks (VLANs) that are operable to define logical compartments corresponding to the severable computer network zones. Some embodiments provide that the severable computer network zones correspond to multiple respective geographical locations. In some embodiments, the severable computer network zones correspond to pre-existing business entities. Some embodiments provide that the severable computer network zones correspond to multiple functional departments.

Some embodiments described herein include a computer program product that includes a computer readable storage medium having computer readable program code embodied therein, the computer readable program code. Some embodiments include computer readable program code configured to detect, within a first zone of multiple severable computer network zones, non-compliant network activity in another zone of the severable computer network zones. Some embodiments include computer readable program code configured to selectively disconnect, responsive to detecting the non-compliant network activity in the first zone, ones of multiple intra-network communication connections that communicatively couple ones of the severable computer network zones to isolate the first zone from other of the severable computer network zones.

Some embodiments may include computer readable program code configured to generate zone-specific compliance policies. In some embodiments, non-compliant network activity arriving from another zone via corresponding ones of the intra-network communication connections is detected by each of the severable computer network zones using the zone-specific compliance policies. In some embodiments, the zone-specific compliance policies include multiple non-compliant activity signatures and non-compliant network activity in another zone is detected using the non-compliant activity signatures.

Some embodiments provide that the severable computer network zones include virtual local area networks (VLANs) that are operable to define logical compartments corresponding to the severable computer network zones. Some embodiments provide that the severable computer network zones include a plurality of geographical locations. In some embodiments, the severable computer network zones include multiple organizational distinctions. In some embodiments, the severable computer network zones include multiple of functional distinctions.

Some embodiments provide that the computer readable storage medium includes computer readable program code that is configured to be executed by at least one of multiple computer network devices.

Some embodiments described herein include a network device that includes a network interface that is communicatively coupled to other network devices in a first zone of multiple severable computer network zones and is operable to communicate with other ones of the severable computer network zones. Some embodiments include a policy module that is operable to maintain a first zone-specific compliance policy corresponding to network activity, a detection module that is operable to detect non-compliant network activity in a second zone of the severable computer network zones, and a disconnection module that is operable to disconnect the network device from the second zone responsive to detection of non-compliant network activity in the second zone.

In some embodiments, the policy module is further operable to receive at least one non-compliant activity signature and the detection module is further operable to detect non-compliant network activity in another zone using the at least one non-compliant activity signatures. Some embodiments provide that the severable computer network zones include multiple geographical, organizational and/or functional distinctions. In some embodiments, the severable computer network zones include multiple virtual local area networks (VLANs) that are operable to define logical compartments corresponding to the severable computer network zones.

Other systems, methods, and/or computer program products according to embodiments described herein will be or become apparent to one with skill in the art upon review of the following drawings and detailed description. It is intended that all such additional systems, methods, and/or computer program products be included within this description, be within the scope as described herein, and be protected by the accompanying claims.

DETAILED DESCRIPTION OF EXEMPLARY EMBODIMENTS

Specific exemplary embodiments now will be described with reference to the accompanying drawings. Embodiments may include many different forms and should not be construed as limited as set forth herein; rather, these embodiments are provided so that this disclosure will be thorough and complete, and will fully convey the scope thereof to those skilled in the art. The terminology used in the detailed description of the particular exemplary embodiments illustrated in the accompanying drawings is not intended to be limiting. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

In accordance with some embodiments herein, protecting a network may include isolating non-compliant or "bad behavior" on the network. In this manner, the larger portion of the network may be protected from the spread of the non-compliant behavior. Instead of permitting essentially unrestricted internal network traffic, large complex networks may be defined in terms of zones. Such zones may be defined by geography, business entity and/or functional characteristics, among others. Each of the zones may be susceptible to different network risks and/or may generate different protection and/or compliance policies accordingly. When non-compliant network activity is detected within a zone, that zone may be isolated from other zones, thus potentially reducing the capacity for such non-compliant activity to adversely impact the other zones. Examples of non-compliant network activity may include unauthorized access and/or requests, computer viruses and/or worms, and/or other types of network attacks, among others.

Figure 1:
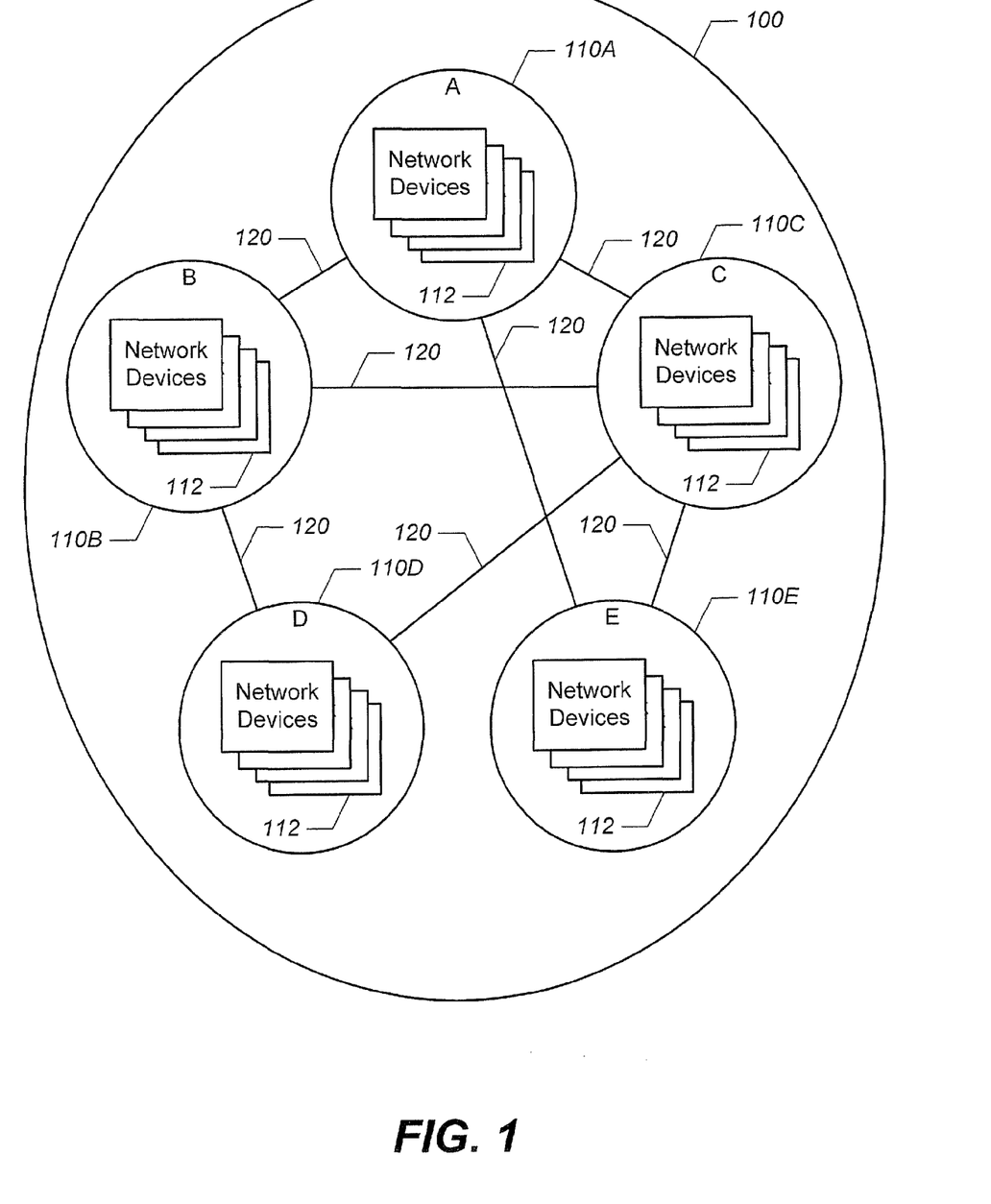
FIG. 1 is a network schematic diagram of a computer network including severable network zones according to some embodiments described herein.

Reference is now made to FIG. 1, which is a network schematic diagram of a computer network including severable network zones according to some embodiments described herein. Some embodiments provide that a computer network 100 includes multiple network devices 112 and may be defined as multiple severable computer network zones 110A-E that each may include one or more of the network devices 112. The severable computer network zones 110A-E may be operable to transmit and/or receive data from one another via multiple intra-network communication connections 120. In this manner, the severable computer network zones 110A-E may be communicatively coupled to one another via the intra-network communication connections 120. The term "severable" as used herein refers to the characteristic that the computer network zones may be capable of positive isolation and/or separation from other ones of the computer network zones.

In some embodiments, one or more network devices 112 in the severable computer network zones 110A-E may be operable to detect non-compliant network activity in another one of the severable computer network zones 110A-E. When non-compliant network activity is detected in one of the severable computer network zones (e.g., "zone A") 110A, other ones of the severable computer network zones 110B, C, and E ("zones B, C, and E") may disconnect corresponding intra-network communication connections 120 to isolate zone A 110A from zones B, C, and E 110B, C, and E. In this manner, the non-compliant network activity in zone A 110A may be isolated and thus the larger portion of the computer network 100 may be protected.

Although generally discussed herein in the context of detecting non-compliant network activity in one zone by another zone, some embodiments provide that a zone may detect non-compliant network activity within its own zone and isolate itself from other of the zones in response thereto.

Additionally, although not illustrated, connections to external networks and/or devices may be monitored and/or disconnected responsive to the detection of non-compliant network activity.

In some embodiments, each of the severable computer network zones 110A-E may be operable to generate zone-specific compliance policies by which to determine non-compliance network activity. For example, a zone corresponding to a help desk department in a corporate environment may generate policies having lower sensitivity than a zone corresponding to finance and/or accounting functions. In this manner each of the severable computer network zones 110A-E may determine which network activities are deemed to be non-compliant and may disconnect itself from another zone in which that non-compliant network activity is detected.

Some embodiments provide that the zone-specific compliance policies may include non-compliant activity signatures. In some embodiments, non-compliant activity signatures may be hard-coded and/or specific. In this regard, non-compliant network activity may be determined by comparing network traffic and/or activities to the non-compliant activity signatures. Some embodiments provide that detection of non-compliant network activity may be performed via observation of a pattern of network activity that may exactly, closely and/or loosely correspond to the signatures. For example, a pattern of activity may not exactly match the contents of a known virus and/or worm that is known to be moving through the network. In this regard use of non-compliant activity signatures may include heuristic observations of patterns of behavior.

In some embodiments, the non-compliant network signatures may be provided via a third party such as, for example, a service provider and/or vendor. For example, some embodiments provide that service providers, who may have access to significant amounts of backbone information, may alert subscribers regarding malicious and/or non-compliant network activity using non-compliant activity signatures.

Some embodiments provide that the non-compliant activity signatures may be developed within ones of the severable computer network zones 110A-E. In some embodiments, non-compliant activity signatures may be provided to and/or developed by in-house and/or managed security service providers (MSSPs).

In some embodiments, the severable computer network zones 110A-E may include virtual local area networks (VLANs) that may be operable to define logical compartments corresponding to the severable computer network zones 110A-E. Some embodiments provide that the severable computer network zones 110A-E comprise multiple geographical, organizational and/or functional distinctions. For example, in some embodiments, the severable computer network zones 110A-E may include zones corresponding to different geographically delineated business sites. For example, a first zone may correspond to a business site in a first city, a second zone may correspond to a business site in a second city, etc. Regarding functional distinctions, by way of example, a first zone may correspond to an accounting function, a second zone may correspond to a sales function and a third zone may correspond to a manufacturing function. In some embodiments, the zones may be differentiated by previously defined business entities, such as may occur in the case of mergers and/or acquisitions, among others. Thus, a first zone may correspond to a first previously existing business entity, a second zone may correspond to a second previously existing business entity, etc.

Some embodiments provide that enforcement of compliance policies may be provided by the network devices 112. In some embodiments, such network devices 112 may include network traffic control devices including routers, switches, hubs and/or bridges, among others. In some embodiments, network devices 112 may include Layer 3 devices in the Open Systems Interconnection (OSI) model of networking, which provides a layered description for communications and computer network protocol design.

Some embodiments, network devices 112 may use Network-Based Application Recognition (NBAR), which is a mechanism to recognize data flow by the first packet. NBAR, which may be used in dealing with malicious software, may perform a deep packet inspection on the first packet of data flow to determine which traffic category the flow belongs to.

Figure 2:
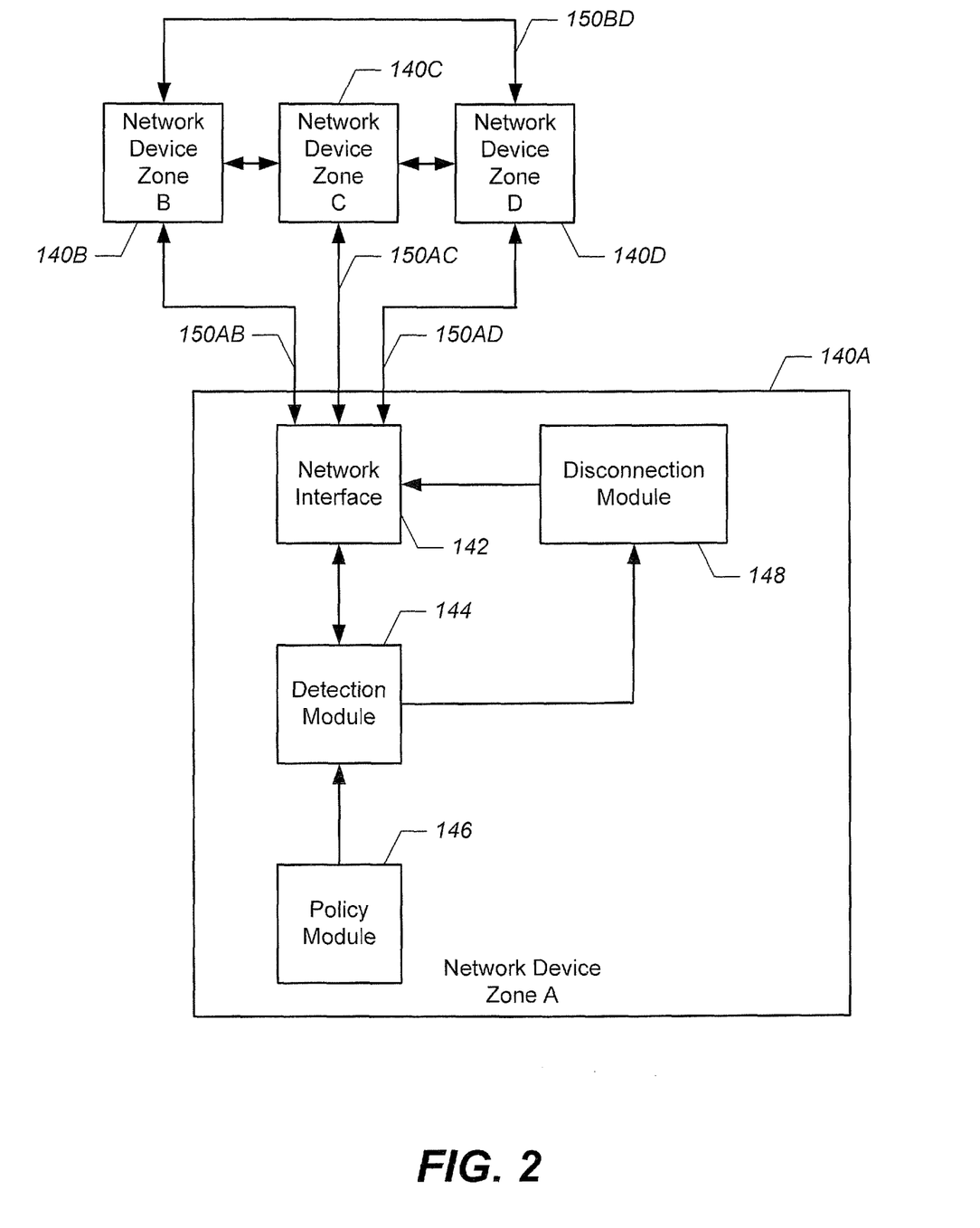
FIG. 2 is a block diagram of a network device as implemented in a system according to some embodiments described herein.

Reference is now made to FIG. 2, which is a block diagram of a network device as implemented in a system according to some embodiments described herein. A network device, such as network device 140A, may include a network interface 142 that may be coupled to other network devices corresponding to a severable computer network zone. The network interface 142 may provide a communication interface between the network devices 140A in its own severable computer network zone (zone A) and network devices 140B-D corresponding to other severable computer network zones (zones B-D).

In some embodiments, the severable computer network zones A-D may be communicatively coupled via one or more intra-network communication connections 150. For example, an intra-network communication connection 150AB may provide communications between zones A and B.

Some embodiments provide that the network device 140A includes a policy module 146 that is operable to maintain and/or establish a first zone-specific compliance policy corresponding to network activity. In some embodiments, policy modules 146 in each of the zones (A-D) may establish and/or maintain compliance policies by receiving and/or generating non-compliant activity signatures. Each of the zones A-D may include network devices 140A-140D that include policy modules 146. Further, some embodiments provide that each policy module 146 may maintain and/or establish a zone-specific compliance policy that is specific to the requirements, activity, function, equipment and/or content, among others, corresponding to that specific zone.

A detection module 144 may be operable to detect non-compliant network activity in another of the severable computer network zones. In some embodiments, the detection module 144 may use one or more of the non-compliant network activity signatures maintained and/or established by the policy module 146 to detect the non-compliant network activity.

A disconnection module 148 may be operable to disconnect the network device (e.g., 140A) from another network device (e.g., 140B) responsive to detection of non-compliant network activity in the other severable computer network zone (zone B). In some embodiments, the disconnection module 148 may accomplish the disconnection by sending a disconnect command to the network interface 142 in response to receiving a non-compliant network activity signal from the detection module 144. Although illustrated as distinct functional blocks, some embodiments provide that some of the modules and/or the network interface described herein may be merged into one or more functional modules, subroutines, and/or circuits, among others.

Although not illustrated, a network device 140 may include a data processing system having a processor that communicates with a memory via an address/data bus. The processor can be any commercially available or custom microprocessor. The memory is representative of the overall hierarchy of memory devices containing the software and data used to implement the functionality of the data processing system. The memory can include, but is not limited to, the following types of devices: cache, ROM, PROM, EPROM, EEPROM, flash memory, SRAM, and DRAM.

The memory may include several categories of software and data used in the data processing system including the operating system, the application programs, the input/output (I/O) device drivers, and/or the data, among others. As will be appreciated by those of skill in the art, the operating system may be any operating system suitable for use with a data processing system, such as Solaris from Sun Microsystems, OS/2, AIX or System390 from International Business Machines Corporation, Armonk, N.Y., Windows95, Windows98, Windows NT, Windows ME, Windows XP or Windows2000 from Microsoft Corporation, Redmond, Wash., Unix or Linux, among others. The I/O device drivers may include software routines accessed through the operating system by the application programs to communicate with network coupled devices, input/output devices, such as a display, keyboard and/or the like, and certain memory components. The application programs are illustrative of the programs that implement the various features of the data processing system (network device) and may include at least one application that supports operations according to embodiments of the present disclosure. Finally, the data may represent the static and dynamic data used by the application programs, the operating system, the I/O device drivers, and/or other software programs that may reside in the memory.

Figure 3A:
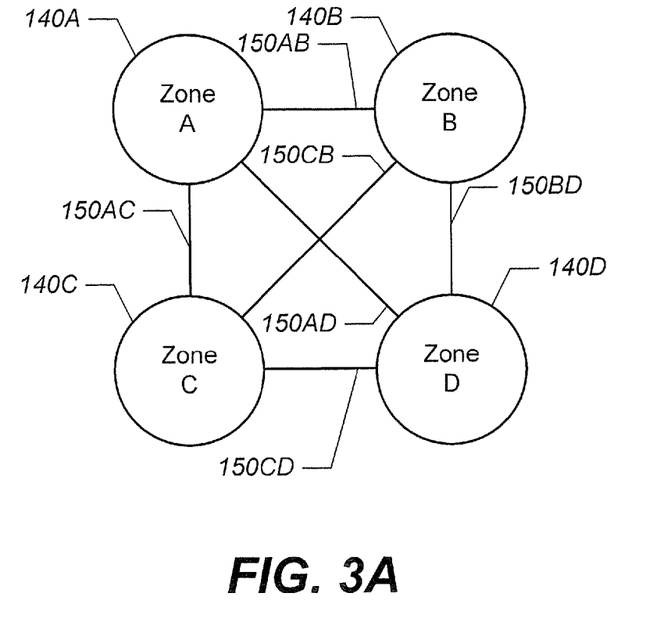
FIGS. 3A and 3B are network schematic diagrams illustrating a network before and after non-compliant network activity is detected, respectively, in a computer network including severable computer network zones according to some embodiments described herein.
Figure 3B:
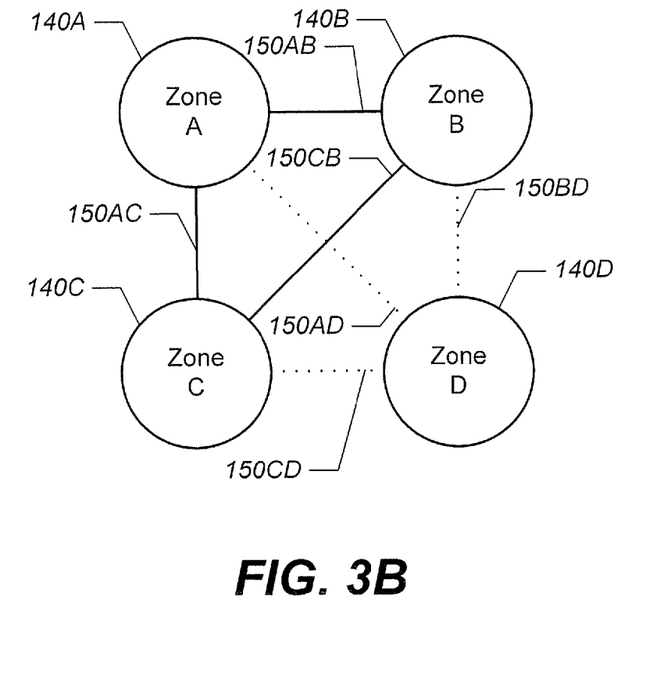

Reference is now made to FIGS. 3A and 3B, which are network schematic diagrams illustrating a network before and after non-compliant network activity is detected, respectively, in a computer network including severable computer network zones according to some embodiments described herein. Referring to FIG. 3A, a computer network includes multiple severable computer network zones 140A-140D. The computer network may be a local area network and/or wide area network managed by a corporation or the like and may include various security features to control external access to the network.

The severable computer network zones 140A-140D may be communicatively coupled via intra-network communication connections 150. By way of example, the communication connections 150 are further identified according to the severable computer network zones 140A-140D between which they are connected. For example, communication connection 150AC provides communications between severable computer network zones 140A and 140C, communication connection 150BD provides communications between severable computer network zones 140B and 140D, etc.

The severable computer network zones 140A-D are capable of detecting non-compliant network activity in and/or between one another as disclosed herein. In response to detecting non-compliant network activity, each of the severable computer network zones 140A-D may disconnect itself from a severable computer network zone 140A-D in which the non-compliant network activity is detected. For example, referring to FIG. 3B, severable computer network zones 140A-C have disconnected communication connections 150AD, 150BD and 150CD in response to the detection of non-compliant network activity in severable computer network zone 140D. In this manner, severable computer network zone 140D is isolated from the larger portion of the computer network and risks to the network that are associated with the non-compliant network activity may be reduced. Note that the severable computer network zones 140A-C may still be operable and in communication with one another even after severable computer network zone 140D is isolated from the computer network. Further, if severable computer network zone 140D detects non-compliant network activity within zone D, it may disconnect itself from the other severable computer network zones 140A-C.

Figure 4:
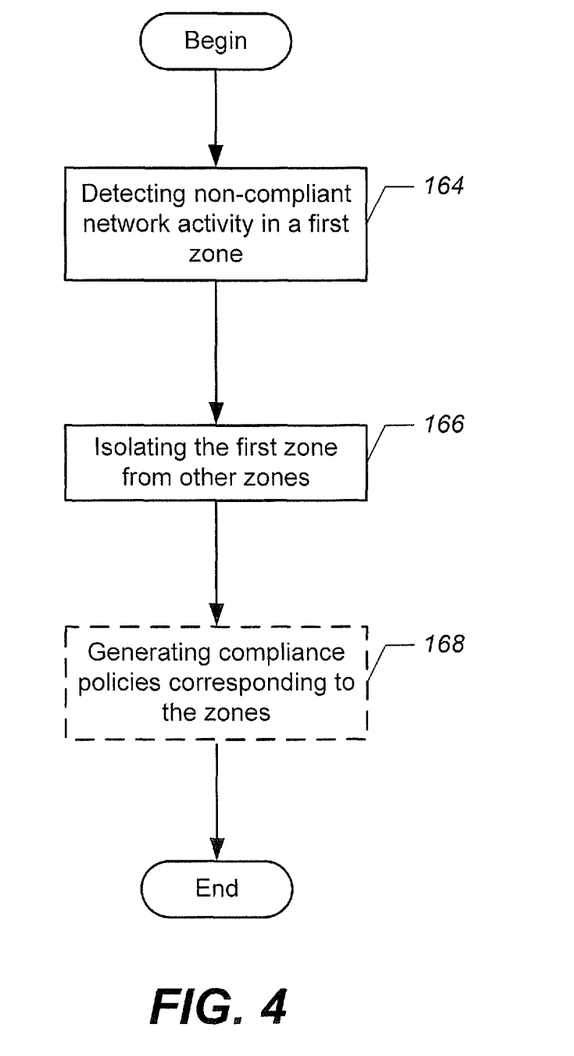
FIG. 4 is a block diagram illustrating operations for protecting a computer network according to some embodiments described herein.

Reference is now made to FIG. 4, which is a block diagram illustrating operations for protecting a computer network according to some embodiments described herein. In some embodiments, operations may be performed by a computer program product including computer readable storage medium having computer readable program code embodied thereon. Operations may include detecting non-compliant network activity that occurs in one of multiple severable computer network zones (block 164). Some embodiments provide that each of the zones is operable to transmit and/or receive data to and/or from at least one other of the severable computer network zones. Some embodiments may include multiple intra-network communication connections through which ones of the severable computer network zones may transmit and/or receive data to and/or from other ones of the severable computer network zones. Some embodiments provide that the zones correspond to virtual local area networks (VLANs) that provide logical compartments that can be isolated and/or quarantined from a larger portion of the network.

In some embodiments, the detecting may be performed in one or more other ones of the severable computer network zones. Some embodiments provide that the non-compliant activity is determined using the zone-specific compliance policies corresponding to other severable computer network zones. For example, the first zone may include the non-compliant network activity and a second zone may detect the non-compliant network activity in the first zone using a compliance policy that is specific to the second zone.

In some embodiments, the severable computer network zones of the computer network may be defined corresponding to geographical locations. For example, a first zone may correspond to a first geographical location, a second zone may correspond to a second geographical location, etc. Some embodiments provide that the severable computer network zones of the computer network may be defined corresponding to different and/or pre-existing business entities. For example, a complex network may be formed when networks of different business entities are merged in response to a corporate merger and/or acquisition, among others. In this manner, a first zone may correspond to, for example, a first company, a second zone may correspond to a second company that was acquired by and/or merged with the first company, etc. In some embodiments, the severable computer network zones of the computer network may be defined corresponding to functional departments. For example, a first zone may correspond to a first department such as, for example, accounting, and a second zone may correspond to a second department such as, for example, research and development.

Some embodiments provide that the intra-network communication connections may be identified by and/or within network devices including, but not limited to, network traffic control devices such as routers, switches, hubs and/or bridges, among others.

Some embodiments may include isolating a zone in which non-compliant network activity is detected from other of the severable computer network zones (block 166). For example, in response to detecting non-compliant network activity occurring in a first zone, a second zone may disconnect and/or sever an intra-network communication connection to the first zone, thereby isolating the first zone from the second zone. In this manner, the second zone may be protected from the non-compliant network activity occurring in the first zone.

Some embodiments provide that other ones of the severable computer network zones may detect the non-compliant network activity occurring in the first zone and disconnect corresponding ones of the intra-network communication connections to the first zone, thereby isolating the first zone from a larger portion of the computer network. In this manner, the non-compliant network activity may be prevented from spreading to a larger portion of the computer network.

Some embodiments described herein may optionally include generating compliance policies corresponding to the severable computer network zones (block 168). In some embodiments, a zone-specific compliance policy may be generated corresponding to each of the severable computer network zones. Some embodiments provide that the compliance policies may be generated when the severable computer network zones are defined. For example, each zone may have a compliance policy that protects that zone from particular types and/or levels of non-compliant network activity. In some embodiments, generating the compliance policies may include receiving non-compliant activity signatures that correspond to particular types of non-compliant network activity. Some embodiments provide that the non-compliant signatures may be received from a network and/or internet provider and/or managed security service provider (MSSP). In some embodiments, detecting the non-compliant network activity may include analyzing network activity using the non-compliant activity signatures.

Figure 5:
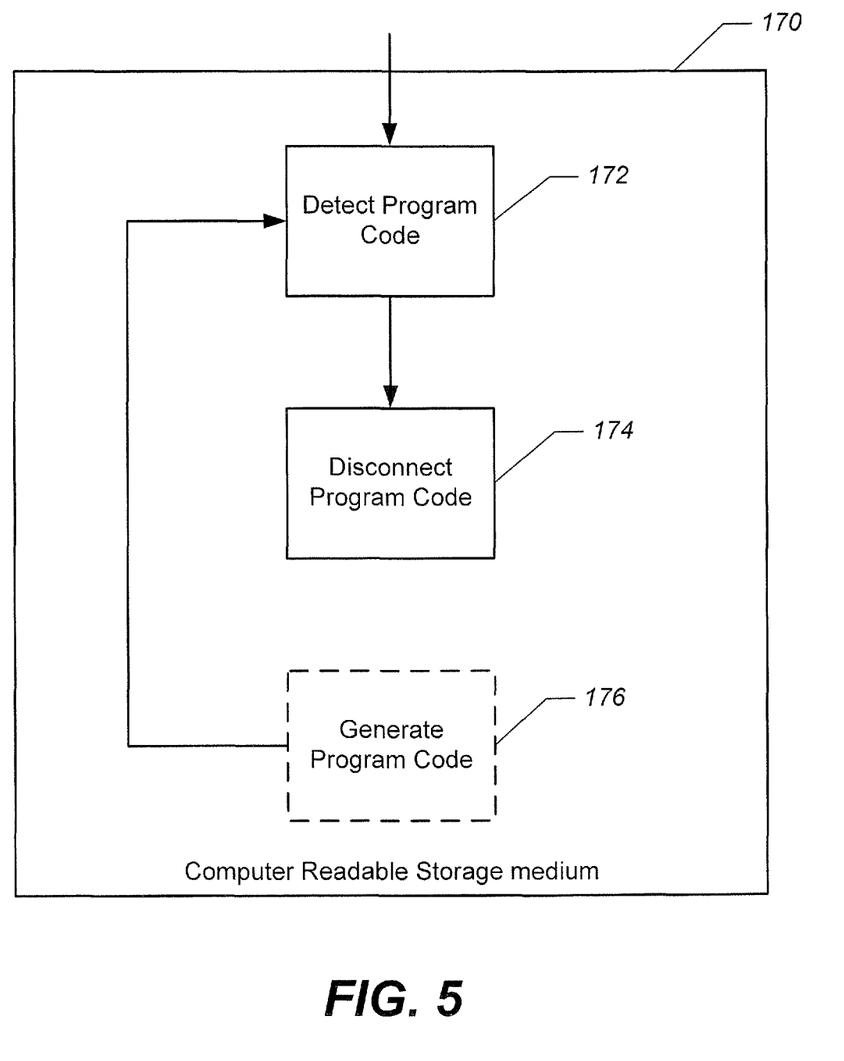
FIG. 5 is a block diagram illustrating computer readable storage medium for protecting a computer network according to some embodiments described herein.

Reference is now made to FIG. 5, which is a block diagram illustrating computer readable storage medium 170 for protecting a computer network according to some embodiments described herein. The computer readable storage medium 170 may include computer readable program code that is operable to detect (block 172), within a first zone of multiple severable computer network zones, non-compliant network activity in another of the severable computer network zones.

Some embodiments provide that the computer readable storage medium 170 includes computer readable program code that is configured to selectively disconnect (block 174) ones of multiple intra-network communication connections that communicatively couple ones of the severable computer network zones to one another. The disconnection may be responsive to detection of the non-compliant network activity and may isolate the first zone from other ones of the severable computer network zones.

Some embodiments may optionally include computer readable program code that is configured to generate zone specific compliance policies corresponding to the zones (block 176). In some embodiments, the non-compliant network activity arriving from another zone via corresponding ones of the intra-network communication connections may be detected by each of the severable computer network zones using the zone-specific compliance policies. In some embodiments, the zone-specific compliance policies include non-compliant activity signatures and the non-compliant network activity may be detected using the non-compliant activity signatures.

Some embodiments provide that the severable computer network zones include virtual local area networks (VLANs) that are operable to define logical compartments corresponding to the severable computer network zones. In some embodiments, the severable computer network zones include multiple geographical locations. In some embodiments, the severable computer network zones include multiple organizational distinctions. For example, ones of the zones may correspond to pre-existing corporate and/or business entities that existed before a corporate merger and/or acquisition. In some embodiments, the severable computer network zones include multiple functional distinctions. For example, the zones may be defined in terms of departments within an organization and/or network.

In some embodiments, the computer readable storage medium 170 includes computer readable program code that is configured to be executed by at least one of multiple computer network devices.

As will be appreciated by one of skill in the art, the present disclosure may be embodied as a method, system, or computer program product. Accordingly, the present disclosure may take the form of an entirely hardware embodiment, a software embodiment or an embodiment combining software and hardware aspects all generally referred to herein as a "circuit" or "module." Furthermore, the present disclosure may take the form of a computer program product comprising a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present disclosure may be written in an object oriented programming language such as Java®, Smalltalk, PERL or C++. However, the computer program code for carrying out operations of the present disclosure may also be written in conventional procedural programming languages, such as the "C" programming language and/or a lower level assembler language. The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present disclosure was described in part above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and schematic diagrams of FIGS. 1 through 4 illustrate the architecture, functionality, and/or operations of some embodiments of methods, systems, devices and computer program products for protecting a computer network. In this regard, each block may represent a module, segment, or portion of code, which comprises one or more executable instructions for implementing the specified logical function (s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments. Although specific terms are employed, they are used in a generic and descriptive sense only and not for purposes of limitation, the scope of the disclosure being defined by the following claims.

That which is claimed is:

1. A computer implemented method of protecting a computer network, the method comprising:

generating a plurality of compliance policies corresponding to each of a plurality of severable computer network zones in a computer network via a respective network device in each of the plurality of severable computer network zones, wherein each one of the plurality of severable computer network zones in the computer network is operable to transmit and receive data to and from at least one other of the plurality of severable computer network zones in the computer network and wherein there are a plurality of intra-network communication connections through which ones of the plurality of severable computer network zones in the computer network transmit and receive data to and from other ones of the plurality of severable computer network zones in the computer network;

detecting non-compliant network activity in a first zone of the plurality of severable computer network zones in the computer network via a first network device in the first zone; and responsive to detecting the non-compliant network activity in the first zone of the plurality of severable computer network zones in the computer network via the first network device, isolating, via the first network device, the first zone from other ones of the plurality of severable computer network zones by disconnecting ones of the plurality of intra-network communication connections that are between the first zone of the plurality of severable computer network zones in the computer network and other ones of the plurality of severable computer network zones in the computer network.

2. The computer implemented method according to claim 1, wherein generating the plurality of compliance policies comprises receiving, from a service provider, a plurality of non-compliant activity signatures, and wherein detecting non-compliant network activity comprises analyzing network activity using the plurality of non-compliant activity signatures.

3. The computer implemented method according to claim 1, wherein the plurality of severable computer network zones in the computer network include a plurality of virtual local area networks that are operable to define logical compartments corresponding to the plurality of severable computer network zones in the computer network.

4. The computer implemented method according to claim 1, wherein the plurality of severable computer network zones in the computer network correspond to a plurality of respective geographical locations.

5. The computer implemented method according to claim 1, wherein the plurality of severable computer network zones in the computer network correspond to a plurality of pre-existing business entities.

6. The computer implemented method according to claim 1, wherein the plurality of severable computer network zones in the computer network correspond to a plurality functional departments.

* * * * *